(12) United States Patent
Yang

(10) Patent No.: US 6,876,849 B2
(45) Date of Patent: Apr. 5, 2005

(54) METHOD FOR SUPPORTING MULTI-CALL WHEN INTERWORKING BETWEEN UTRAN AND SYNCHRONOUS CORE NETWORK IN IMT-2000 SYSTEM

(75) Inventor: Shin-Hyun Yang, Seoul (KR)

(73) Assignee: UTStarcom, Inc., Alameda, CA (US)

( * ) Notice: Subject to any disclaimer, the term of this patent is extended or adjusted under 35 U.S.C. 154(b) by 546 days.

(21) Appl. No.: 09/861,361

(22) Filed: May 18, 2001

(65) Prior Publication Data

US 2002/0025801 A1 Feb. 28, 2002

(30) Foreign Application Priority Data

Aug. 31, 2000  (KR) ........................................ 2000-51257

(51) Int. Cl.[7] .............................................. H04M 3/42
(52) U.S. Cl. ..................................... 455/416; 370/352
(58) Field of Search ................................ 370/352, 329, 370/331; 455/416, 432.1, 450, 452.1, 452.2, 511

(56) References Cited

U.S. PATENT DOCUMENTS

| | | | |
|---|---|---|---|
| 5,517,549 A | | 5/1996 | Lee ............................. 379/58 |
| 6,055,437 A | * | 4/2000 | Riley et al. ................. 455/511 |
| 6,072,787 A | | 6/2000 | Hamalainen et al. ....... 370/335 |
| 6,072,988 A | | 6/2000 | Minegishi .................... 455/62 |
| 6,285,667 B1 | * | 9/2001 | Willars et al. .............. 370/329 |
| 6,343,215 B1 | * | 1/2002 | Calabrese et al. ........ 455/432.1 |
| 6,374,112 B1 | * | 4/2002 | Widegren et al. ......... 455/452.2 |
| 6,529,490 B1 | * | 3/2003 | Oh et al. .................... 370/331 |
| 6,594,241 B1 | * | 7/2003 | Malmlof ..................... 370/329 |
| 6,654,610 B1 | * | 11/2003 | Chen et al. ................. 455/450 |

* cited by examiner

*Primary Examiner*—Fan Tsang
*Assistant Examiner*—Gerald Gauthier
(74) *Attorney, Agent, or Firm*—McDonnell Boehnen Hulbert & Berghoff LLP

(57) ABSTRACT

A method for supporting a multi-call in an IMT-2000 system providing a plurality of services including a voice communication service, a moving picture service and a radio internet service, wherein the IMT-2000 system includes one or more mobile stations, one or more radio networks and one or more core networks includes the steps of: in response to a call request of the mobile station, transmitting an origination message to the radio network; generating a CM service request message based on the origination message and transmitting the CM service request message to the core network; determining whether the call request is an initial call request or an additional call request based on the CM service request message, wherein the additional call request means a request of an additional traffic channel for using other service; generating one or more traffic channels for the mobile station; and storing a first identity for the mobile station and a second identity for an assigned traffic channel in a storage unit.

6 Claims, 13 Drawing Sheets

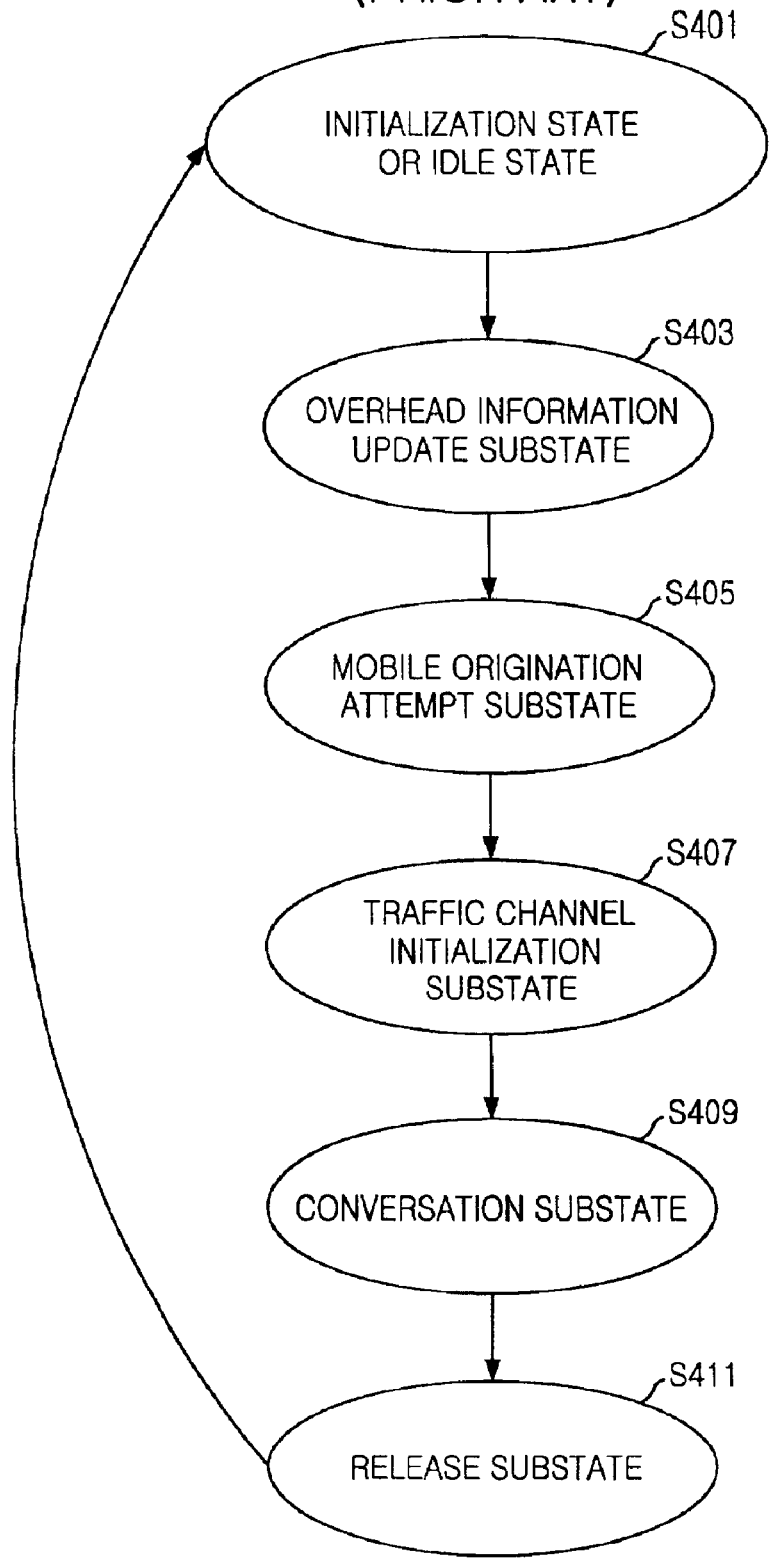

FIG. 5
(PRIOR ART)

| Information Element | Section Reference | Element Direction | Type | |
|---|---|---|---|---|
| Protocol Discriminator | 6.2.2.39 | BS -> MSC | M$^m$ | |
| Reserved – Octet | 6.2.2.40 | BS -> MSC | M | |
| Message Type | 6.2.2.4 | BS -> MSC | M | |
| CM Service Type | 6.2.2.51 | BS -> MSC | M$^m$ | |
| Classmark Information Type 2 | 6.2.2.15 | BS -> MSC | M$^{a,\,m}$ | |
| Mobile Identity | 6.2.2.16 | BS -> MSC | M$^m$ | |
| Called Party BCD Number | 6.2.2.52 | BS -> MSC | O$^b$ | C |
| Mobile Identity (ESN) | 6.2.2.16 | BS -> MSC | O$^m$ | R |
| Slot Cycle Index | 6.2.2.17 | BS -> MSC | O$^c$ | C |
| Authentication Response Parameter (AUTHR) | 6.2.2.46 | BS -> MSC | O$^d$ | C |
| Authentication Confirmation Parameter (RANDC) | 6.2.2.42 | BS -> MSC | O$^e$ | C |
| Authentication Parameter COUNT | 6.2.2.47 | BS -> MSC | O | C |
| Authentication Challenge Parameter (RAND) | 6.2.2.45 | BS -> MSC | O$^f$ | C |
| Service Option | 6.2.2.66 | BS -> MSC | O$^{g,\,m}$ | R |
| Voice Privacy Request | 6.2.2.13 | BS -> MSC | O | C |
| Radio Environment and Resources | 6.2.2.82 | BS -> MSC | O$^h$ | R |
| Called Party ASCII Number | 6.2.2.105 | BS -> MSC | O$^i$ | C |
| Circuit Identity Code | 6.2.2.22 | BS -> MSC | O$^j$ | C |
| Authentication Event | 6.2.2.114 | BS -> MSC | O$^k$ | C |
| Authentication Data | 6.2.2.137 | BS -> MSC | O$^l$ | C |
| PACA Reorigination Indicator | 6.2.2.151 | BS -> MSC | O$^n$ | C |
| User Zone ID | 6.2.2.32 | BS -> MSC | O | C |
| *IS-2000* Mobile Capabilities | 6.2.2.70 | BS -> MSC | O$^o$ | C |

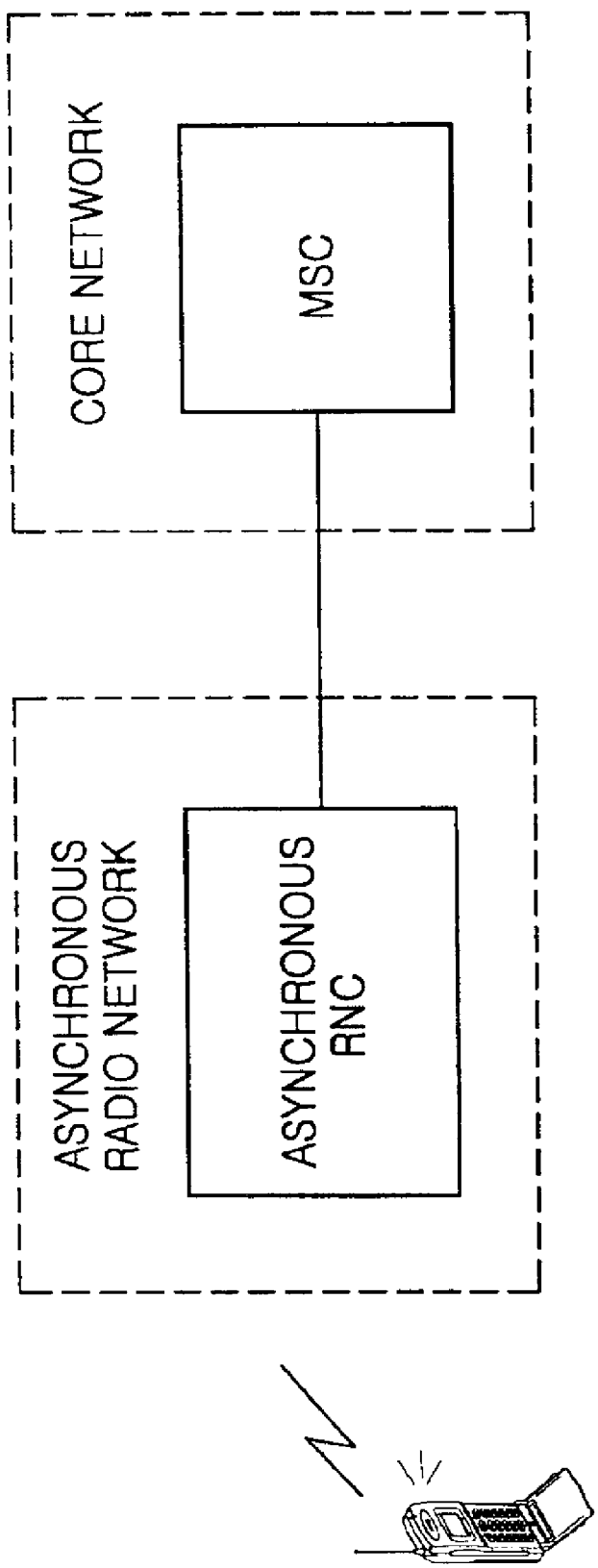

| Field | Length (bits) |
|---|---|
| AUTH_MODE | 2 |
| AUTHR | 0 or 18 |
| RANDC | 0 or 8 |
| COUNT | 0 or 6 |
| CSM_ID | 8 |
| REQUEST_ID | 4 |
| PACA_CALL | 1 |
| EMERGENCY_CALL | 1 |
| DIALED_DIGS_INCL | 1 |
| DIGIT_MODE | 0 or 1 |
| NUMBER_TYPE | 0 or 3 |
| NUMBER_PLAN | 0 or 4 |
| NUM_FIELDS | 0 or 8 |

FIG. 7B 0 or NUM_FIELDS occurrences of the following field:

| CHARi | 4 or 8 |
|---|---|

| NUM_SO | 3 |
|---|---|

NUM_SO occurrences of the following field:

| SO | 16 |
|---|---|

| PM | 1 |
|---|---|
| RETURN_CAUSE | 4 |
| UZID_INCL | 1 |
| UZID | 0 or 16 |
| DRS | 0 or 1 |
| BASE_ID | 16 |
| MOB_CAPAB_INCL | 1 |
| MOB_TERM | 0 or 1 |
| MOB_P_REV | 0 or 8 |
| ENCRYPTION_SUPPORTED | 0 or 4 |
| PACA_SUPPORTED | 0 or 1 |

| NAR_AN_CAP | 0 or 1 |
|---|---|
| NUM_RECS | 4 |

NUM_RECS occurrences of the following records:.

| RECORD_TYPE | 8 |
|---|---|
| RECORD_LEN | 8 |
| <Record-type specific fields> | RECORD_LEN x 8 |

FIG. 8

| Information Element | Section Reference | Element Direction | Type | |
|---|---|---|---|---|
| Protocol Discriminator | 6.2.2.39 | BS -> MSC | $M^m$ | |
| Reserved – Octet | 6.2.2.40 | BS -> MSC | M | |
| Message Type | 6.2.2.4 | BS -> MSC | M | |
| CM Service Type | 6.2.2.51 | BS -> MSC | $M^m$ | |
| CSM ID | | BS -> MSC | M | |
| Classmark Information Type 2 | 6.2.2.15 | BS -> MSC | $M^{a, m}$ | |
| Mobile Identity | 6.2.2.16 | BS -> MSC | $M^m$ | |
| Called Party BCD Number | 6.2.2.52 | BS -> MSC | $O^b$ | C |
| Mobile Identity (ESN) | 6.2.2.16 | BS -> MSC | $O^m$ | R |
| Slot Cycle Index | 6.2.2.17 | BS -> MSC | $O^c$ | C |
| Authentication Response Parameter (AUTHR) | 6.2.2.46 | BS -> MSC | $O^d$ | C |
| Authentication Confirmation Parameter (RANDC) | 6.2.2.42 | BS -> MSC | $O^e$ | C |
| Authentication Parameter COUNT | 6.2.2.47 | BS -> MSC | O | C |
| Authentication Challenge Parameter (RAND) | 6.2.2.45 | BS -> MSC | $O^f$ | C |
| Service Option | 6.2.2.66 | BS -> MSC | $O^{g, m}$ | R |
| Voice Privacy Request | 6.2.2.13 | BS -> MSC | O | C |
| Radio Environment and Resources | 6.2.2.82 | BS -> MSC | $O^h$ | R |
| Called Party ASCII Number | 6.2.2.105 | BS -> MSC | $O^i$ | C |
| Circuit Identity Code | 6.2.2.22 | BS -> MSC | $O^j$ | C |
| Authentication Event | 6.2.2.114 | BS -> MSC | $O^k$ | C |
| Authentication Data | 6.2.2.137 | BS -> MSC | $O^l$ | C |
| PACA Reorigination Indicator | 6.2.2.151 | BS -> MSC | $O^n$ | C |
| User Zone ID | 6.2.2.32 | BS -> MSC | O | C |
| *IS-2000* Mobile Capabilities | 6.2.2.70 | BS -> MSC | $O^o$ | C |

METHOD FOR SUPPORTING MULTI-CALL WHEN INTERWORKING BETWEEN UTRAN AND SYNCHRONOUS CORE NETWORK IN IMT-2000 SYSTEM

FIELD OF THE INVENTION

This invention relates to an international mobile telecommunication-2000 (IMT-2000) system; and more particularly, to a method for supporting multi-calls in an IMT-2000 system.

DESCRIPTION OF THE PRIOR ART

Conventional international mobile telecommunication-2000 (IMT-2000) system can have two types of interworking structure: a first interworking structure of a synchronous mobile station—a synchronous radio network—a synchronous ANSI-41 core network (shown in FIG. 1A); and a second interworking structure of an asynchronous mobile station—an asynchronous radio network—an asynchronous GSM-MAP core network (shown in FIG. 1B).

FIG. 2A shows a configuration of a radio network and a core network that are coupled each other in a conventional synchronous IMT-2000 system.

FIG. 2B shows a configuration of a radio network and a core network that are coupled each other in a conventional asynchronous IMT-2000 system.

FIG. 3A shows a protocol stack structure of the above first interworking structure shown in FIG. 1A.

FIG. 3B shows a protocol stack structure of the above second interworking structure shown in FIG. 1B.

Referring to FIG. 1A and FIG. 2A, a synchronous radio network (RNS) includes a base transceiver stations (BTS) and a base station controller (BSC), wherein the BSC manages a plurality of base transceiver stations (BTS) and is coupled to a mobile switching center (MSC) included in a core network.

Referring to FIG. 1B and FIG. 2B, an asynchronous radio network (RNS) includes a node B and an asynchronous RNC, wherein the RNC manages a plurality of node B.

An IOS is an interface between the core network and the base station controller (BSC) in the synchronous mobile communication system shown in FIG. 2A. An interface between the base station controller (BSC) and the base transceiver station (BTS) is not standardized yet.

An Iu is an interface between the core network and the asynchronous RNC in the asynchronous mobile communication system shown in FIG. 2B. An Iub is an interface between the plurality of Node B and an Iur is a logical interface between a plurality of RNC.

FIG. 4 is a flow chart illustrating a procedure of assigning a traffic channel according to transition of a mobile station state in a conventional IMT-2000 system.

At an initialization state, if power is supplied to an mobile station, the mobile station selects a CDMA system with which the mobile station can communicate by using information and a CDMA system selection algorithm that are stored in a memory thereof. The CDMA system selection algorithm is provided by a manufacturer of the mobile station.

After selecting the CDMA system, the mobile station acquires a pilot channel at a pilot channel acquisition sub-state in order to acquire a pilot and then, selects and communicates with a base transceiver station (BTS). In a step of selecting the BTS, the mobile station acquires a pilot having the same CDMA channel number from the BTS by using a CDMA frequency number, acquires system timing information and adjusts timing in synchronization with the system.

When the initialization state or a system determination sub-state is completed, the mobile station gets in an idle state at the step S401.

At the step S403, the mobile station gets in an update overhead information sub-state. As described above, after acquiring the system timing information and the timing information via the pilot channel, the mobile station receives network-related information including a system parameter or the like and updates its current state. The update of system state information is performed in the idle state of the mobile station. In other words, the update is performed periodically in a state where the mobile station doesn't request a call setup.

At the step S405, the mobile station gets in a mobile origination attempt sub-state. When the mobile station requests the call setup, the IS-2000 layer of the mobile station generates an origination message and transmits the same to the BTS. Upon reception of the origination message, the CM service request message is generated at an IOS protocol control unit of the radio network (RNS) to be transmitted to an upper layer of the core network. The CM service request message is generated with reference to parameters included in the received origination message. The generated CM service request message is transmitted to the upper layer of an MSC (MSC=mobile switching center) included in the core network.

At the step S407, the mobile station gets in a traffic channel initialization sub-state.

The IOS protocol control unit transmits a response to the call request of the mobile station to the mobile station with reference to the parameters included in the CM service request message. In other words, the MSC that updates a user table selects information related to the call-requesting mobile station from the parameters included in the CM service request message. After comparing the information with the user table, the MSC transmits a traffic channel assignment request message to a BSC (BSC=base station controller). After receiving the traffic channel assignment request message, the BSC transmits a traffic channel assignment message to the mobile station. Then, the mobile station receives a traffic channel assigned thereto to thereby transmit the user data to the radio network (RNS).

At the step S409, the mobile station gets in a conversation sub-state.

The mobile station to which the traffic channel is assigned transmits the user data via the assigned traffic channel.

At the step S411, the mobile station gets in a release sub-state.

In other words, the mobile station releases the assigned traffic channel and returns back to the initialization state or the system determination sub-state.

In a word, if the origination message is transmitted from the mobile station to the BTS, the origination message is converted to the CM service request message while passing via the BTS and the BSC and then transmitted to the MSC. After receiving the CM service request message, the MSC identifies the mobile station by a call table managed therein and then assigns the traffic channel to the mobile station.

As shown in FIG. 5, a parameter supporting a multi-call is not defined in a conventional IOS CM service request message. In a way, in case a subscriber wants to use two or more services among a plurality of services including a voice communication service, a moving picture service, a radio internet service or the like in a conventional IMT-2000 system, it is required to provide as many traffic channels as services that the subscriber wants. However, it is not possible to support the multi-call because a parameter supporting the above requirement is not defined in the conventional IOS CM service request message.

Accordingly, it is needed to define a proper parameter in a message for supporting the multi-call within an IOS document, wherein the IOS document is a protocol for interworking the UTRAN and the ANSI-41 network.

SUMMARY OF THE INVENTION

It is an object of the present invention to provide a method for supporting a multi-call in an IMT-2000 system and computer-readable record media storing instructions for performing the method to provide a plurality of services including a voice communication service, a moving picture service and a radio internet service to subscribers.

In accordance with an aspect of the present invention, there is provided a method for supporting a multi-call in an IMT-2000 system providing a plurality of services including a voice communication service, a moving picture service and a radio internet service, wherein the IMT-2000 system includes one or more mobile stations, one or more radio networks and one or more core networks, the method including the steps of: in response to a call request of the mobile station, transmitting an origination message to the radio network; generating a CM service request message based on the origination message and transmitting the same to the core network; determining whether the call request is an initial call request or an additional call request based on the CM service request message, wherein the additional call request means a request of an additional traffic channel for using other service; generating one or more traffic channels for the mobile station; and storing a first identity for the mobile station and a second identity for an assigned traffic channel in a storage unit.

BRIEF DESCRIPTION OF THE DRAWINGS

Other objects and aspects of the invention will become apparent from the following description of the embodiments with reference to the accompanying drawings, in which:

FIG. 4 is a flow chart illustrating a procedure of assigning a traffic channel according to transition of a mobile station state in a conventional IMT-2000 system;

FIG. 5 shows a configuration of a conventional IOS service request message;

FIG. 6A shows a configuration of a mobile communication system wherein a mobile station, an asynchronous radio network and a synchronous core network interwork together;

FIG. 6B illustrates configuration of protocol stacks each of a mobile station, an asynchronous radio network and a synchronous core network in a mobile communication system shown in FIG. 6A;

FIG. 7 shows a configuration of a DS-41 call start up message;

FIG. 8 shows a configuration of an IOS CM service request message in accordance with the present invention.

DETAILED DESCRIPTION OF THE PREFERRED EMBODIMENTS

FIG. 6A shows a configuration of a mobile communication system wherein a mobile station, an asynchronous radio network and a synchronous core network interwork together.

Figure 6B:
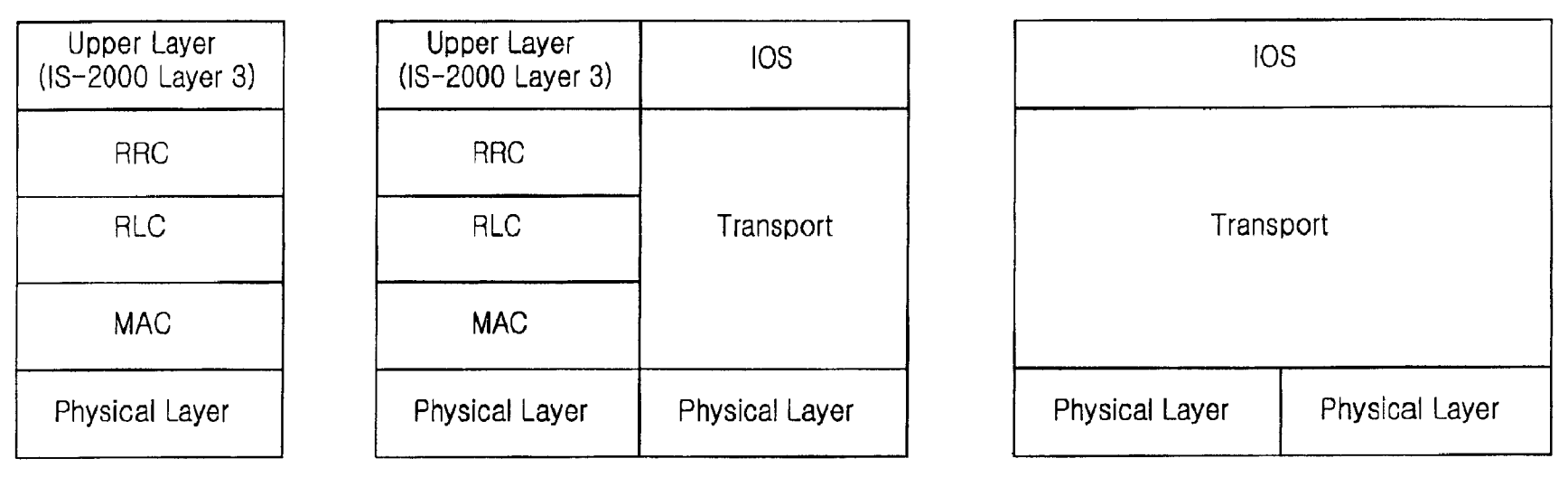

FIG. 6B illustrates configuration of protocol stacks each of a mobile station, an asynchronous radio network and a synchronous core network in a mobile communication system shown in FIG. 6A.

Figure 1A:
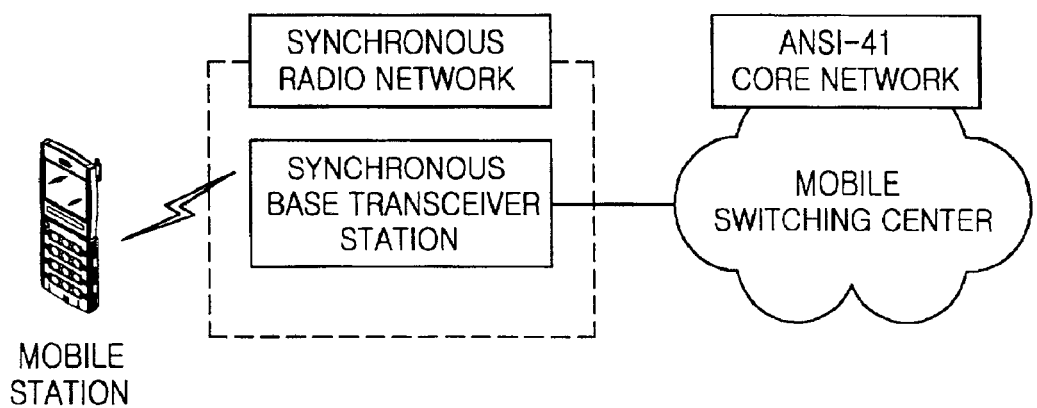
FIG. 1A shows a configuration of a conventional synchronous IMT-2000 system.
Figure 1B:
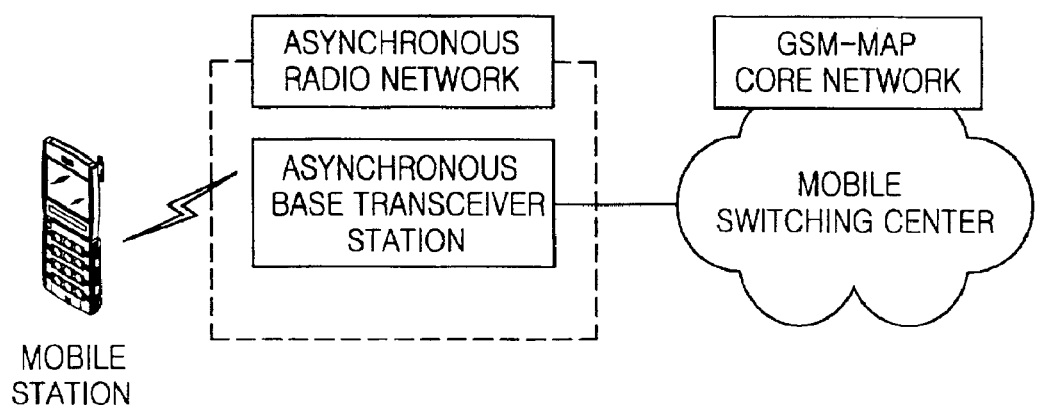
FIG. 1B shows a configuration of a conventional asynchronous IMT-2000 system
Figure 2A:
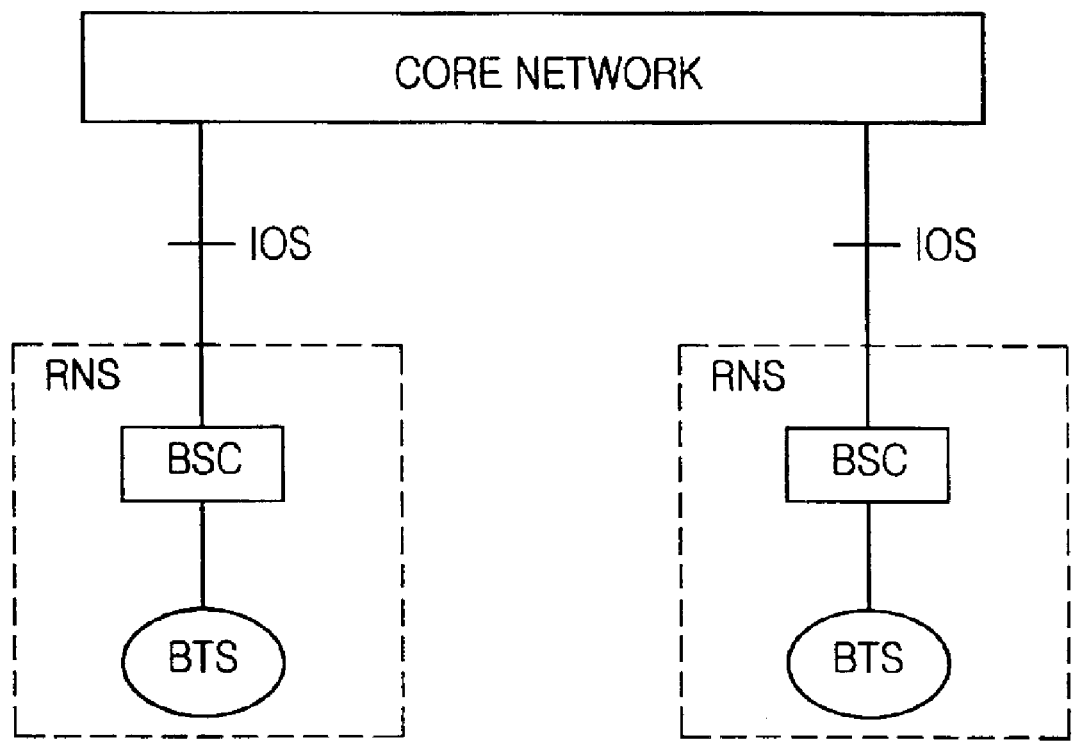
FIG. 2A shows a configuration of a radio network and a core network that are coupled each other in a conventional synchronous IMT-2000 system.
Figure 2B:
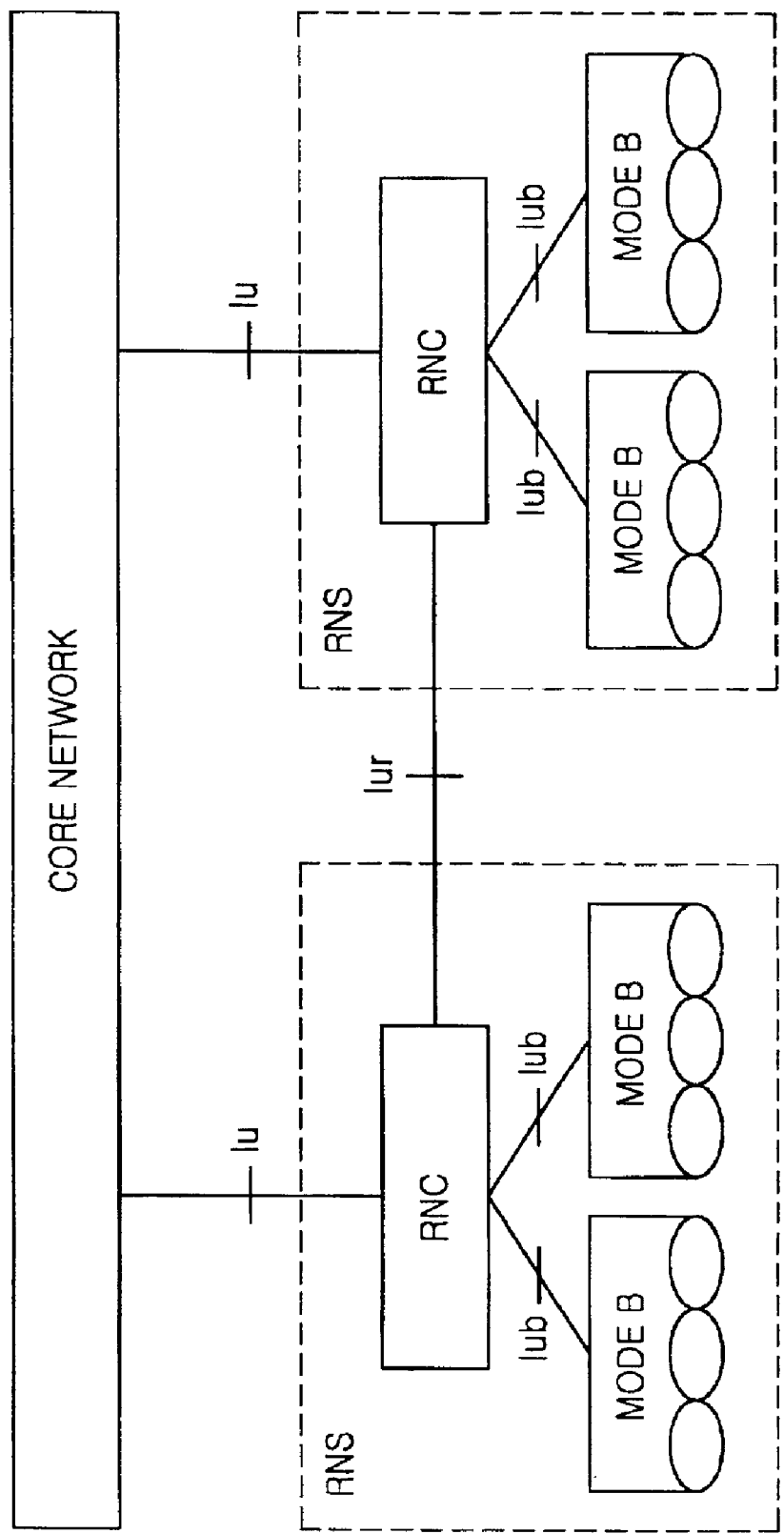
FIG. 2B shows a configuration of a radio network and a core network that are coupled each other in a conventional asynchronous IMT-2000 system.
Figure 3A:
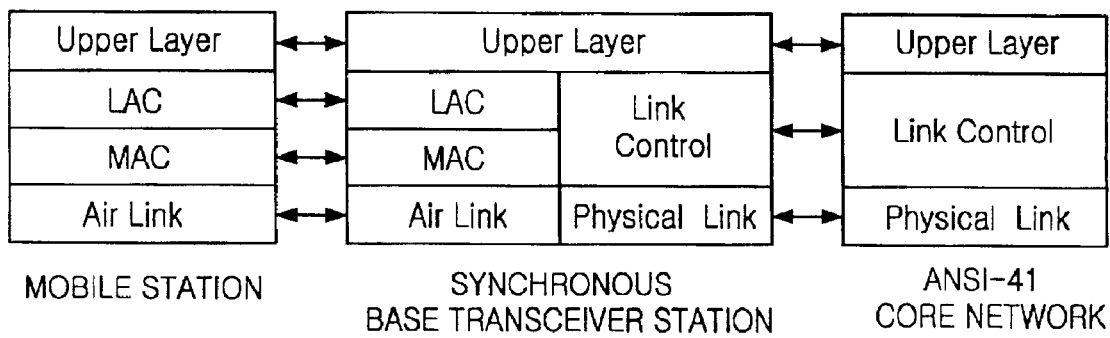
FIG. 3A shows a protocol stack configuration of an interworking structure shown in FIG. 1A.
Figure 3B:
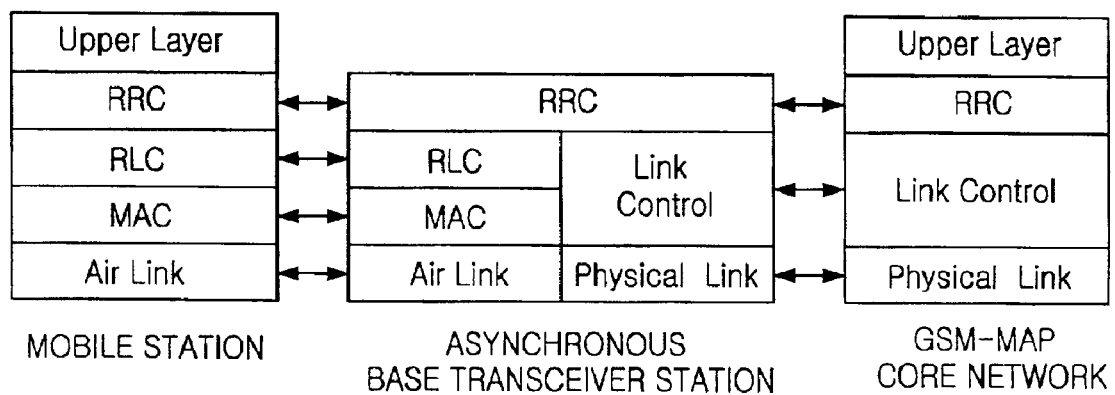
FIG. 3B shows a protocol stack configuration of an interworking structure shown in FIG. 1B.
Figure 6C:
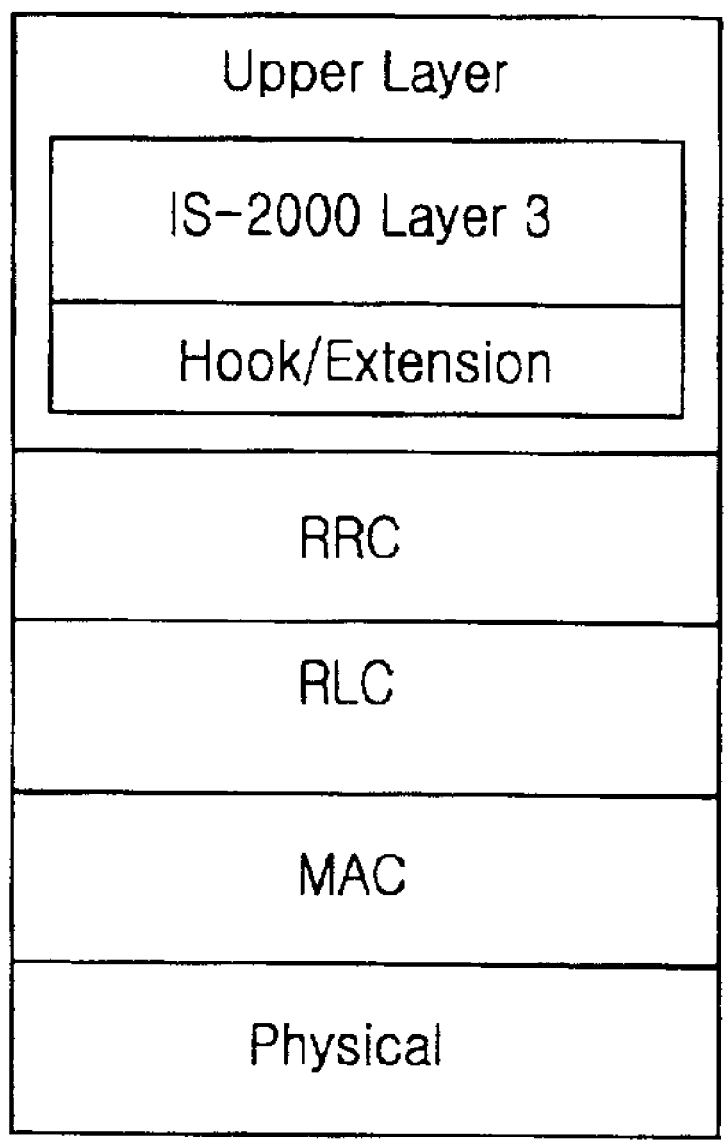
FIG. 6C shows a configuration of a protocol of a mobile station to which the present invention applied.

As shown in FIGS. 6A to 6C, in case a radio transmission section is asynchronous, a GSM-MAP (GSM-MAP=Global System for Mobile communications-Mobile Application Part) network or an ANSI-41 (ANSI=American National Standards Institute) network can be used as a core network depending on network development.

In case an asynchronous radio section protocol, a UTRAN, interworks with the ANSI-41 network for synchronous call control and mobility management, a standard document for interworking the UTRAN and the ANSI-41 network is included in a protocol stack configuration of a mobile station. The standard document is represented "Direct Spread Specification for Spread Spectrum System on ANSI-41 (DS-41)-Upper Layers Air Interface" that is the protocol stack of the mobile station.

As shown in FIG. 6A, a Hook & Extension is used for the synchronous call control and mobility management and the asynchronous radio section protocol is used in an IMT-2000 system. A WCDMA is applied to a radio section between the mobile station and the asynchronous radio network (RNS) and an IOS protocol is applied between the asynchronous radio network (RNS) and the synchronous core network.

As shown in FIG. 6C, in configuration of the protocol of the mobile station, a synchronous IS-2000 (or CDMA2000) layer 3 protocol is used for an upper layer and a structure of a protocol of an asynchronous mobile station is used for lower protocols below the upper layer. In other words, the protocol of the asynchronous mobile station is used for the radio section, however the synchronous IS-2000 and IOS protocols are used for the upper layer.

In this case, the IS-2000 (or cdma2000) layer 3 protocol is different from a protocol of a synchronous mobile station in a synchronous radio communication system including the synchronous mobile station, a synchronous radio network and a synchronous core network in that the Hook & Extension is included in the IS-2000 (or cdma2000) layer 3 protocol.

The reason of difference is as follows. In case a system includes a synchronous mobile station, an asynchronous radio network (RNS) and a synchronous core network, it is required to preclude interaction from being unable to generate between an upper layer having a protocol of a synchronous mobile station and lower layers below the RRC layer having a protocol of an asynchronous mobile station.

Referring to FIG. 6C, it appears that the Hook & Extension is added in the IS-2000 layer 3 protocol. The drawing shows just a conceptual representation of the Hook & Extension included in the IS-2000 layer 3 protocol. Thus, it should be noted that actually, parameters necessary for interworking are included in the IS-2000 layer 3 protocol.

FIG. 7 shows a configuration of a DS-41 call start up message.

Referring to FIG. 7, the DS-41 call start up message is used for connection setup within "Direct Spread Specification for Spread Spectrum Systems on ANSI-41 (DS-41)- Upper layers Air Interface" that is a standard document for interworking the UTRAN and the ANSI-41 network. The standard document for interworking the UTRAN and the ANSI-41 network, that is, the IS-2000 layer 3 protocol includes parameters for supporting a multi-call.

The DS-41 call start up message is an origination message in the system including the synchronous mobile station, the asynchronous radio network (RNS) and the synchronous core network. A CSM_ID is included in the DS-41 call start up message, wherein the CSM_ID is a parameter for the multi-call and defined by 1 byte. The CSM_ID represents information about an identifier for a mobile station, namely, a mobile station ID and an identifier for an assigned traffic channel, namely, a call ID.

FIG. 8 shows a configuration of an IOS CM service request message in accordance with the present invention.

Referring to FIG. 8, the CM service request message within the IOS standard document includes a CSM_ID in order to support the multi-call along with the DS-41 call start up message including the CSM_ID shown in FIG. 7. The CSM_ID represents information about the identifier for the mobile station and the identifier for the assigned traffic channel like the CSM_ID included in the DS-41 call start up message. A mobility identity can be used for the mobile station ID, wherein the mobility identity is included in the CM service request message.

Figure 9:
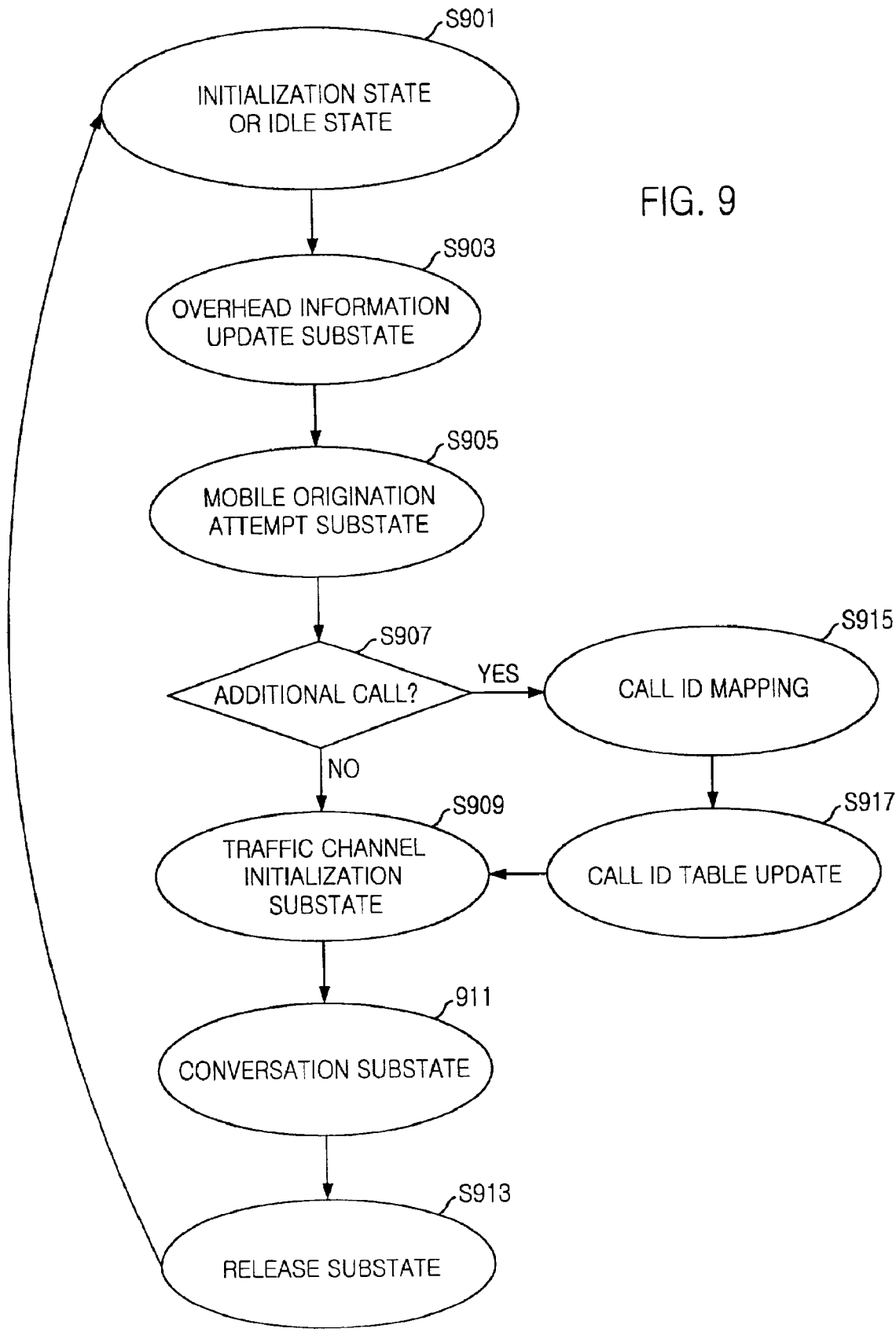
FIG. 9 shows a configuration of a synchronous channel message in accordance with the present invention.

FIG. 9 is a flow chart illustrating a procedure of assigning a traffic channel according to transition of a mobile station state in an IMT-2000 system in accordance with the present invention.

At an initialization state, if power is supplied to an mobile station, the mobile station selects a CDMA system with which the mobile station can communicate by using information and a CDMA system selection algorithm that are stored in a memory thereof. The CDMA system selection algorithm is provided by a manufacturer of the mobile station.

After selecting the CDMA system, the mobile station acquires a pilot channel at a pilot channel acquisition sub-state in order to acquire a pilot and then, selects and communicates with a base transceiver station (BTS). In a step of selecting the BTS, the mobile station acquires a pilot having the same CDMA channel number from the BTS by using a CDMA frequency number, acquires system timing information and adjusts timing in synchronization with the system.

When the initialization state or a system determination sub-state is completed, the mobile station gets in an idle state at the step S901.

At the step S903, the mobile station gets in an update overhead information sub-state. As described above, after acquiring the system timing information and the timing information via the pilot channel, the mobile station receives network-related information including a system parameter or the like and updates its current state. The update of system state information is performed in the idle state of the mobile station. In other words, the update is performed periodically in a state where the mobile station doesn't request a call setup.

At the step S905, the mobile station gets in a mobile origination attempt sub-state. When the mobile station requests the call setup, the IS-2000 layer of the mobile station generates an origination message and transmits the same to the BTS. Upon reception of the origination message, the CM service request message is generated at an IOS protocol control unit of the radio network (RNS) to be transmitted to an upper layer of the core network. The CM service request message is generated with reference to parameters included in the received origination message. The generated CM service request message is transmitted to the upper layer of an MSC (MSC=mobile switching center) included in the core network.

At the step S907, an IOS protocol control unit of the MSC of the core network determines whether the call request of the mobile station is an initial call request or an additional call request, namely, a multi-call request. The determination is performed with reference to the parameters included in the CM service request message.

In more detail, the determination is made based on the CSM_ID included in the CM service request message. In other words, the IOS protocol control unit determines the initial call or the additional call based on a call ID, wherein the call ID is assigned to the CSM_ID. For example, in case the mobile station requests the initial call, a call ID including "1" is assigned to the CSM_ID. On the other hand, in case the mobile station requests the additional call, that is, in case the mobile station requests the multi-call for setting up another traffic channel in a state where a traffic channel is already set up, a call ID including "2" is assigned to the CSM_ID.

If the mobile station requests the initial call, at the step S909, the mobile station gets in a traffic channel initialization sub-state.

The IOS protocol control unit transmits a response to the call request of the mobile station to the mobile station with reference to the parameters included in the CM service request message. In other words, the MSC that updates a user table selects information related to the call-requesting mobile station from the parameters included in the CM service request message. After comparing the information with the user table, the MSC transmits a traffic channel assignment request message to a BSC (BSC=base station controller). After receiving the traffic channel assignment request message, the BSC transmits a traffic channel assignment message to the mobile station. Then, the mobile station receives a traffic channel assigned thereto to thereby transmit the user data to the radio network (RNS). The identifier for a mobile station, namely, the mobile station ID and the identifier for an assigned traffic channel, namely, the call ID are represented as a table form and managed at the MSC that assigned the traffic channel.

At the step S911, the mobile station gets in a conversation sub-state.

The mobile station to which the traffic channel is assigned transmits the user data via the assigned traffic channel.

At the step S913, the mobile station gets in a release sub-state.

In other words, the mobile station releases the assigned traffic channel and returns back to the initialization state or the system determination sub-state.

If the mobile station requests the additional call, at the step S915, call ID mapping is performed.

In other words, the MSC searches the mobile station ID and call ID table, wherein at the traffic channel initialization sub-state, the MSC already managed the mobile station ID and call ID table about the mobile station to which the traffic channel is assigned.

At the step S917, it is performed to update the call ID table. The MSC updates the mobile station ID and call ID table by adding a call ID of a new traffic channel to be assigned in the same and then the logic flow proceeds to the step S909.

As described above, in case an asynchronous radio section protocol, a UTRAN interworks with an ANSI-41 network for synchronous call control and mobility management, it is possible to process instance for a multi-call at a radio section and instance for a multi-call between the UTRAN and the ANSI-41 core network by adding a CSM_ID, a parameter included in the DS-41 call start up message in the CM service request message of the IOS message.

Although the preferred embodiments of the invention have been disclosed for illustrative purpose, those skilled in the art will appreciate that various modifications, additions, and substitutions are possible, without departing from the scope and sprit of the invention as disclosed in the accompanying claims.

What is claimed is:

1. A method for supporting a multi-call in an IMT-2000 system providing a plurality of services including a voice communication service, a moving picture service and a radio internet service, wherein the IMT-2000 system includes one or more mobile stations, one or more radio networks and one or more core networks, the method comprising the steps of:

(a) in response to a call request of the mobile station, transmitting an origination message to the radio network;

(b) generating a CM service request message based on the origination message and transmitting the CM service request message to the core network;

(c) determining whether the call request is an initial call request or an additional call request based on the CM service request message, wherein the additional call request corresponds to a request of an additional traffic channel for using other service;

(d) generating one or more traffic channels for the mobile station; and (e) storing a first identity for the mobile station and a second identity for an assigned traffic channel in a storage unit, wherein said step d) comprises the steps of:

(f) if the call request is the additional call request, searching the first identity and the second identity; and (g) adding a third identity for a traffic channel to be newly assigned, and wherein the mobile station is synchronous, the radio network is an asynchronous Universal Mobile Telecommunication System Terrestrial Radio Access Network (UTRAN) and the core network is a synchronous ANSI-41 network, and wherein an IOS protocol sack is used between the UTRAN and the synchronous ANSI-41 network.

2. The method as recited in claim 1, wherein the IOS protocol stack includes the CM service request message, the CM service request message including the first identity and the second identity.

3. The method as recited in claim 2, wherein a DS-41 protocol stack is used between the synchronous mobile station and the UTRAN.

4. The method as recited in claim 3, wherein the DS-41 protocol stack includes a Hook & Extension.

5. The method as recited in claim 4, wherein the origination message at the DS-41 protocol stack is a DS-41 call start up message, the DS-41' call start up message including the first identity and the second identity.

6. Computer-readable record media storing instructions for performing a method for supporting a multi-call in an IMT-2000 system providing a plurality of services including a voice communication service, a moving picture service and a radio internet service, wherein the IMT-2000 system includes one or more mobile stations, one or more radio networks and one or more core networks, the method comprising the steps of:

(a) in response to a call request of the mobile station, transmitting an origination message to the radio network;

(b) generating a CM service request message based on the origination message and transmitting the CM service request message to the core network;

(c) determining whether the call request is an initial call request or an additional call request based on the CM service request message, wherein the additional call request corresponds to a request of an additional traffic channel for using other service;

(d) generating one or more traffic channels for the mobile station; and (e) storing a first identity for the mobile station and a second identity for an assigned traffic channel in a storage unit, wherein said step d) comprises the steps of:

(f) if the call request is the additional call request, searching the first identity and the second identity; and (g) adding a third identity for a traffic channel to be newly assigned, and wherein the mobile station is synchronous, the radio network is an asynchronous UTRAN and the core network is a synchronous ANSI-41 network, and wherein an IOS protocol stack is used between the UTRAN and the synchronous ANSI-41 network.

* * * * *